(12) United States Patent
Huang

(10) Patent No.: US 8,262,071 B2
(45) Date of Patent: Sep. 11, 2012

(54) POSITIONING ASSEMBLY FOR LENS TRIMMER BLADES

(75) Inventor: Chien-Feng Huang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 352 days.

(21) Appl. No.: 12/639,157

(22) Filed: Dec. 16, 2009

(65) Prior Publication Data
US 2011/0011235 A1    Jan. 20, 2011

(30) Foreign Application Priority Data
Jul. 17, 2009  (CN) .......................... 2009 1 0304489

(51) Int. Cl.
| B23Q 3/00 | (2006.01) |
| B25B 1/14 | (2006.01) |
| B25B 1/08 | (2006.01) |
| H02G 1/08 | (2006.01) |
| B63B 35/03 | (2006.01) |
| B61C 11/00 | (2006.01) |
| B61C 13/00 | (2006.01) |
| A63G 1/00 | (2006.01) |
| B61B 15/00 | (2006.01) |

(52) U.S. Cl. ............ 269/289 MR; 269/289 R; 269/228; 269/229; 254/134.3 FT; 254/134.3 R; 105/30; 105/153; 104/53; 104/87

(58) Field of Classification Search ........... 269/289 MR, 269/289 R, 228, 229; 254/134.3 FT, 134.3 R; 29/244, 155, 270; 105/30, 153; 104/53, 104/87
See application file for complete search history.

(56) References Cited

U.S. PATENT DOCUMENTS

| 2,854,941 | A | * | 10/1958 | Vollmer | ................. | 414/433 |
| 5,046,704 | A | * | 9/1991 | Liner | ...................... | 254/348 |
| 5,655,279 | A | * | 8/1997 | Ehrlich | ................. | 29/243.5 |
| 5,673,843 | A | * | 10/1997 | Gainey | ................. | 228/44.5 |
| 6,375,178 | B1 | * | 4/2002 | Schilb et al. | ............. | 269/71 |
| 6,883,783 | B1 | * | 4/2005 | Quittschreiber | ...... | 254/262 |
| 7,987,570 | B2 | * | 8/2011 | Salazar et al. | .......... | 29/244 |

* cited by examiner

Primary Examiner — Monica Carter
Assistant Examiner — Nirvana Deonauth
(74) Attorney, Agent, or Firm — Altis Law Group, Inc.

(57) ABSTRACT

A positioning assembly using a pair of rollers elastically connected to a holding base for clamping two cutters received in the holding base. The cutters in the holding base can be adjusted to make different blades contact and align precisely.

20 Claims, 3 Drawing Sheets

POSITIONING ASSEMBLY FOR LENS TRIMMER BLADES

BACKGROUND

1. Technical Field

The present disclosure relates to positioning assemblies and, particularly, to positioning assemblies capable of aligning blades of a lens trimmer.

2. Description of Related Art

Generally, many plastic injection products, e.g., plastic lenses, need to be separated. A trimmer typically used includes two cutters. The blades of the cutters are aligned so that when the two cutters move towards and engage each other the plastic injection products can be separated by cutting. However, such alignment is often carried out manually by an operator. Thus, the accuracy of the alignment can be less than satisfactory.

Therefore, it is desirable to provide a positioning assembly which can overcome the limitations described.

DETAILED DESCRIPTION

Figure 1:
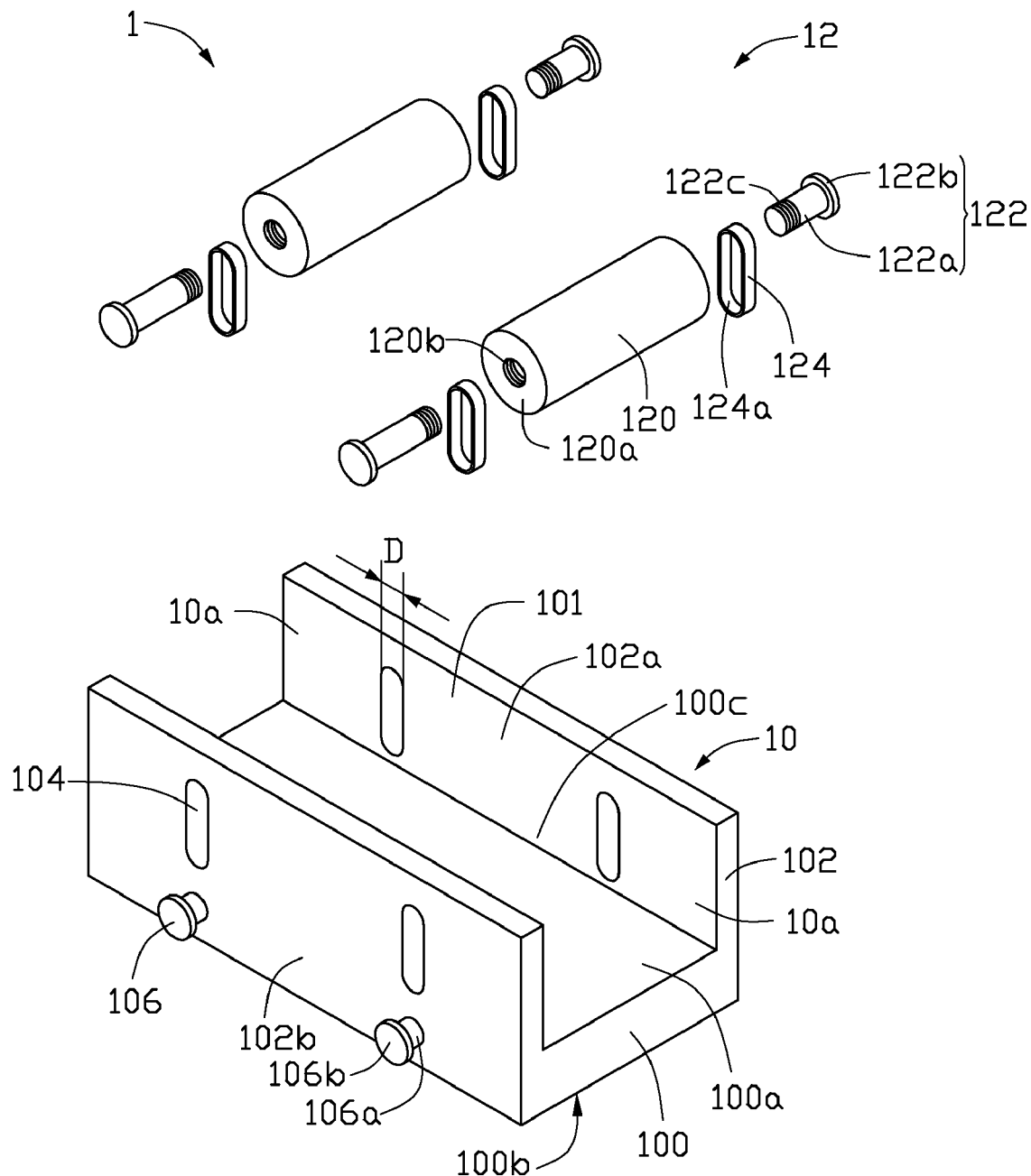
FIG. 1 is an exploded, isometric view of an exemplary embodiment of a positioning assembly.
Figure 2:
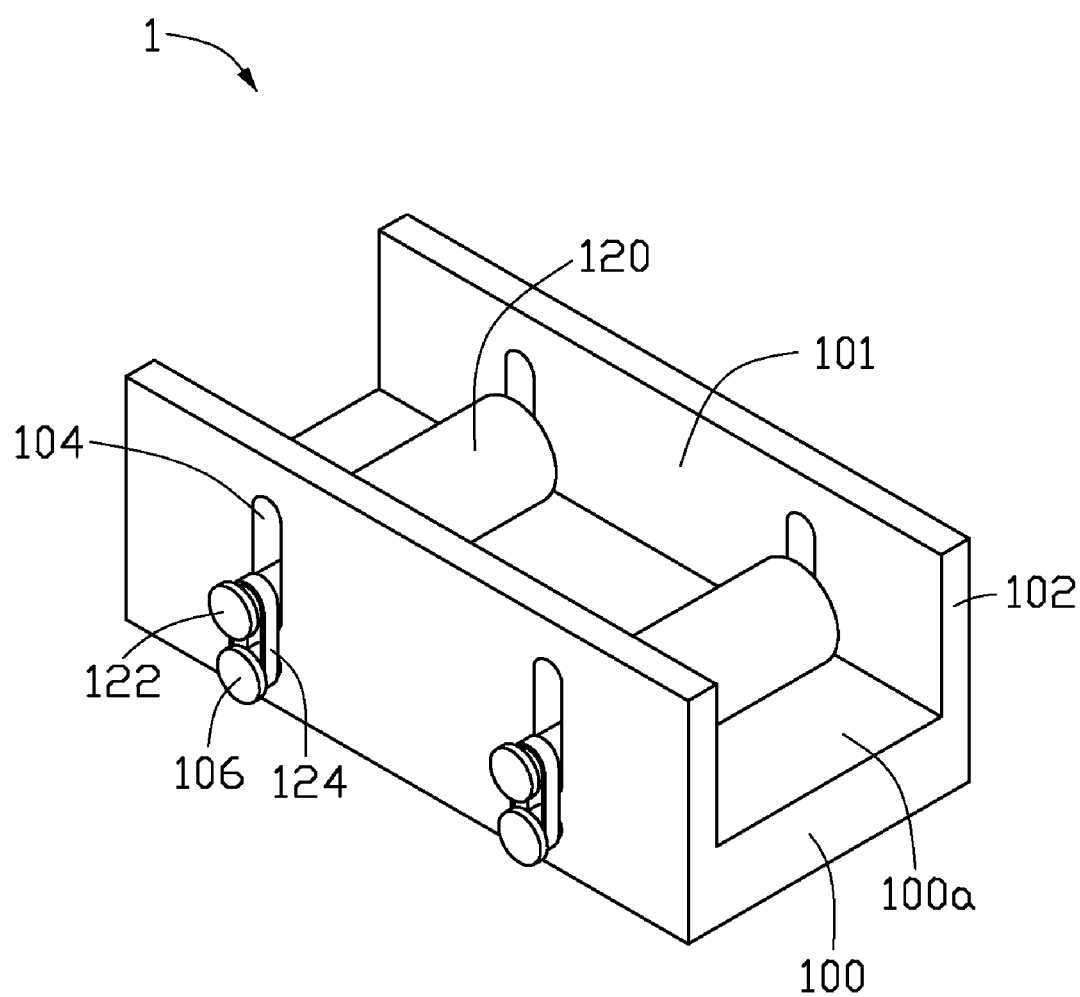
FIG. 2 is an assembled, isometric view of the positioning assembly of FIG. 1.

Referring to FIGS. 1 and 2, a positioning assembly 1, according to an exemplary embodiment, includes a holding base 10, and a clamping unit 12.

The holding base 10 includes a bottom board 100, a pair of parallel sidewalls 102, and a number of fixing protrusions 106. The bottom board 100 is generally rectangular and includes an upper surface 100a, a bottom surface 100b opposite to the upper surface 100a, and a pair of parallel edges 100c. The sidewalls 102 extend perpendicularly from the upper surface 100a at the opposite edges 100c respectively. The bottom board 100 and the sidewalls 102 cooperatively define a receiving space 101 with two opposite open portions 10a for accommodating the clamping unit 12.

Each of the sidewalls 102 defines two through holes 104. The through holes 104 are spaced a same distance from the upper surface 100a and are elongated elliptical. The major axis of the through holes 104 is substantially perpendicular to the upper surface 100a.

Each sidewall 102 includes an inner surface 102a and an outer surface 102b. Each of the fixing protrusions 106 extends perpendicularly from the outer surface 102b and is arranged between the respective through holes 104 and the bottom surface 100b. Each fixing protrusion 106 includes a connecting post 106a and a first positioning flange 106b. The connecting post 106a extends from the outer surface 102b. The first positioning flange 106b extends outwards from a distal end of the connecting post 106a and is spaced apart from the outer surface 102b.

The clamping unit 12 includes a pair of rollers 120, a number of bolts 122, and a number of elastic elements 124. The roller 120 is elongated and circular and includes a pair of parallel end surfaces 120a. The roller 120 defines a threaded hole 120b in the center of each end surface 120a. Each bolt 122 includes a threaded post 122a and a second positioning flange 122b. The threaded post 122a includes a threaded end 122c. The positioning flange 122b extends from the periphery of the other end of the threaded post 122a opposite to the threaded end 122c. The elastic element 124 includes two opposite ends 124a. In this embodiment, four bolts 122 and four elastic elements 124 are employed. Each of the elastic elements 124 is an elastic rubber belt.

In assembly, the rollers 120 are disposed in the receiving space 101 so that the threaded holes 120b are correspondingly aligned with the through holes 104. Each threaded end 122c of the bolts 122a passes through a corresponding through hole 104 and screws into a corresponding threaded hole 120b. Two opposite ends 124a of each elastic element 124 are connected to the threaded post 122a and the connecting post 106a. The elastic elements 124 are stretched for applying a force onto the rollers 120 in a direction toward the bottom board 100. Thus, the rollers 120 are biased against the upper surface 100a by the elastic elements 124.

Figure 3:
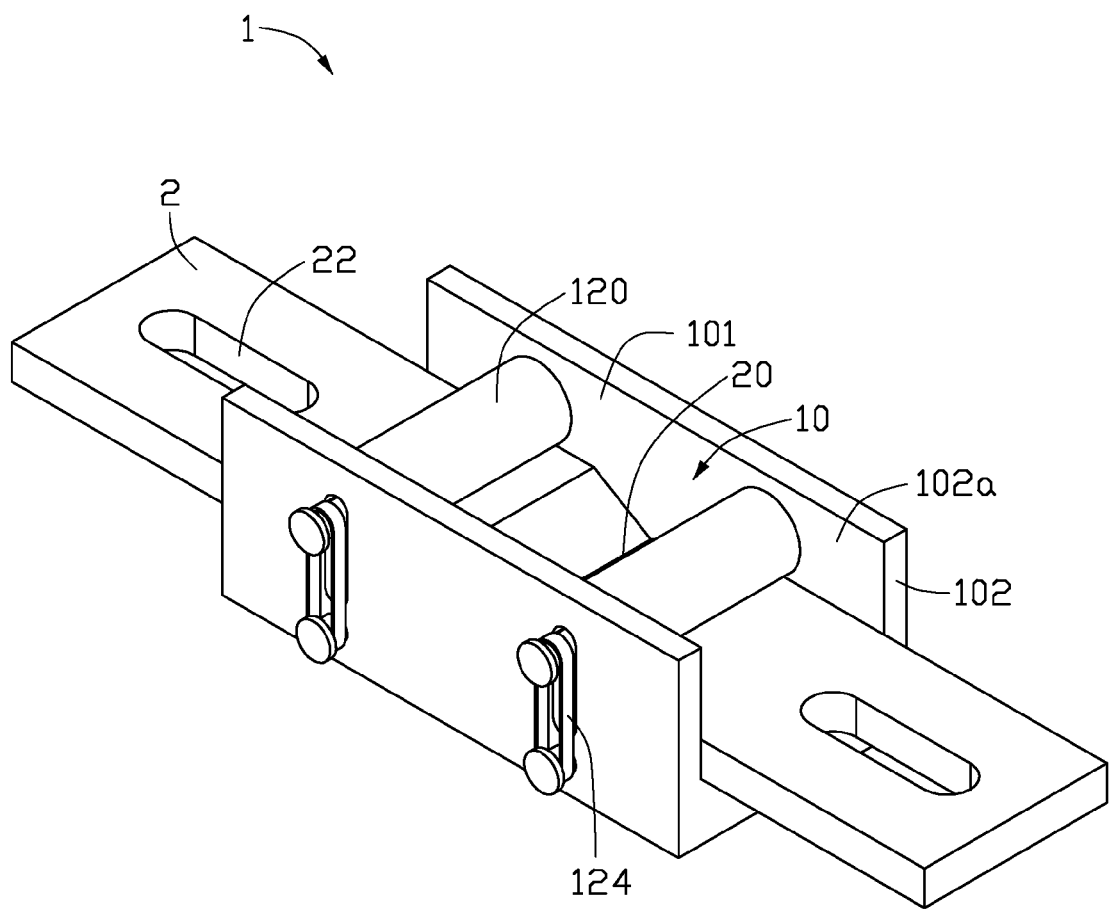
FIG. 3 is an assembled, isometric view of the positioning assembly of FIG. 1, showing the positioning assembly clamps two cutters.

Also referring to FIG. 3, in use, the positioning assembly 1 aligns the blades of two cutters 2. Each cutter 2 includes a blade 20 and defines an assembly hole 22 along a major axis of the blades 20. The cutters 2 are received in the receiving space 101 and the blades 20 face each other. The cutters are interleaved between the rollers and the upper surface so that the rollers 120 press the cutters 2 on the upper surface 100a via the restoring force of the elastic elements 124. The cutters 2 are adjusted such that blades 20 contact each other and the assembly holes 22 stay out of the receiving space 101. The cutters 2 can be attached to a lens trimmer (not shown) with the blades 20 aligned precisely.

While various exemplary and preferred embodiments have been described, it is to be understood that the invention is not limited thereto. To the contrary, various modifications and similar arrangements (as would be apparent to those skilled in the art) are intended to also be covered. Therefore, the scope of the appended claims should be accorded the broadest interpretation so as to encompass all such modifications and similar arrangements.

What is claimed is:

1. A positioning assembly for positioning a plurality of workpieces, comprising:
    a holding base comprising a bottom board and a pair of parallel sidewalls extending upwards perpendicularly from opposite sides of the bottom board; and
    a clamping unit comprising a pair of rollers arranged in a direction parallel to the bottom board and a plurality of elastic elements, opposite ends of each roller slidably connected to the corresponding sidewalls, the elastic elements configured for applying a force onto the rollers in a direction toward the bottom board to position the workpieces on the bottom board.

2. The positioning assembly as claimed in claim 1, wherein the bottom board is generally rectangular and comprises an upper surface, and a bottom surface opposite to the upper surface, the sidewalls extending perpendicular to the upper surface from opposite edges of the bottom board, the bottom board and the sidewalls cooperatively defining a receiving space having two opposite open portions for accommodating the clamping unit.

3. The positioning assembly as claimed in claim 2, wherein each of the sidewalls defines two through holes, the through holes being spaced a same distance from the upper surface and being flattened elongated elliptical in shape, wherein the major axis of each through hole is substantially perpendicular to the upper surface.

4. The positioning assembly as claimed in claim 3, wherein each sidewall comprises an inner surface and an outer surface, and the holding base further comprises a plurality of fixing protrusions extending perpendicularly from the outer surfaces, with each fixing protrusion arranged between a respective one of the through holes and the bottom surface.

5. The positioning assembly as claimed in claim 4, wherein each fixing protrusion comprises a connecting post and a first positioning flange, the connecting post extends from the outer surface, and the first positioning flange extends outwards from a distal end of the connecting post and is spaced apart from the outer surface.

6. The positioning assembly as claimed in claim 5, wherein the clamping unit comprises a number of bolts, each bolt comprises a threaded post and a second positioning flange, the threaded post comprises a threaded end, and the second positioning flange extends from the periphery of the other end of the threaded post opposite to the threaded end.

7. The positioning assembly as claimed in claim 6, wherein the roller is an elongated circular rod and comprises a pair of parallel end surfaces, the roller defines a threaded hole in the center of each end surface, the threaded end of each bolt passes through the corresponding through hole and is engaged in the corresponding threaded hole, and each elastic element wraps around the threaded post and the connecting pole.

8. A positioning assembly comprising:
    a holding base comprising a bottom board and a pair of parallel sidewalls extending upwards perpendicularly from opposite sides of the bottom board; and
    a clamping unit comprising a pair of rollers and a plurality of elastic elements, opposite ends of each roller slidably connected to the corresponding sidewalls, the elastic elements configured for applying a force onto the rollers in a direction toward the bottom board,
    wherein the bottom board is generally rectangular and comprises an upper surface, and a bottom surface opposite to the upper surface, the sidewalls extending perpendicular to the upper surface from opposite edges of the bottom board, and the bottom board and the sidewalls cooperatively defining a receiving space having two opposite open portions for accommodating the clamping unit; and
    each of the sidewalls defines two through holes, the through holes being spaced a same distance from the upper surface and being flattened elongated elliptical in shape, and the major axis of each through hole being substantially perpendicular to the upper surface.

9. The positioning assembly as claimed in claim 8, wherein each sidewall comprises an inner surface and an outer surface, and the holding base further comprises a plurality of fixing protrusions extending perpendicularly from the outer surfaces, with each fixing protrusion arranged between a respective one of the through holes and the bottom surface.

10. The positioning assembly as claimed in claim 9, wherein each fixing protrusion comprises a connecting post and a first positioning flange, the connecting post extends from the outer surface, and the first positioning flange extends outwards from a distal end of the connecting post and is spaced apart from the outer surface.

11. The positioning assembly as claimed in claim 10, wherein the clamping unit further comprises a plurality of bolts, each bolt comprises a threaded post and a second positioning flange, the threaded post comprises a threaded end, and the second positioning flange extends from the periphery of the other end of the threaded post opposite to the threaded end.

12. The positioning assembly as claimed in claim 11, wherein the roller is an elongated circular rod and comprises a pair of parallel end surfaces, the roller defines a threaded hole in the center of each end surface, the threaded end of each bolt passes through the corresponding through hole and is engaged in the corresponding threaded hole, and each elastic element wraps around the threaded post and the connecting pole.

13. A positioning assembly for positioning a workpiece, comprising:
    a holding base comprising a bottom board and a pair of parallel sidewalls extending from the bottom board, the sidewalls being opposite to each other, each of the sidewalls defining a sliding track; and
    a clamping unit comprising a roller and an elastic element, opposite ends of the roller respectively connected to the opposite sidewalls and being slidable along the sliding track to change the distance between the roller and the bottom board, opposite ends of the elastic element respectively connected to the roller and the holding base for applying a force onto the roller in a direction toward the bottom board when the roller slides at any position;
    wherein, when no workpiece is positioned by the positioning assembly, the roller is located at a lowest position defined by the sliding track; and
    when a workpiece is placed into the positioning assembly, the roller is forced to slide away from the bottom board by overcoming the force applied by the elastic element, and clamps the workpiece in cooperation with the bottom board.

14. The positioning assembly as claimed in claim 13, wherein the bottom board is generally rectangular and comprises an upper surface, and a bottom surface opposite to the upper surface, the sidewalls extending perpendicular to the upper surface from opposite edges of the bottom board, the bottom board and the sidewalls cooperatively defining a receiving space having two opposite open portions for accommodating the clamping unit.

15. The positioning assembly as claimed in claim 14, wherein each of the sidewalls defines two through holes, the through holes being spaced a same distance from the upper surface and being flattened elongated elliptical in shape, wherein the major axis of each through hole is substantially perpendicular to the upper surface.

16. The positioning assembly as claimed in claim 15, wherein each sidewall comprises an inner surface and an outer surface, and the holding base further comprises a plurality of fixing protrusions extending perpendicularly from the outer surfaces, with each fixing protrusion arranged between a respective one of the through holes and the bottom surface.

17. The positioning assembly as claimed in claim 16, wherein each fixing protrusion comprises a connecting post and a first positioning flange, the connecting post extends from the outer surface, and the first positioning flange extends outwards from a distal end of the connecting post and is spaced apart from the outer surface.

18. The positioning assembly as claimed in claim 17, wherein the clamping unit further comprises a plurality of bolts, each bolt comprises a threaded post and a second positioning flange, the threaded post comprises a threaded end, and the positioning flange extends from the periphery of the other end of the threaded post opposite to the threaded end.

19. The positioning assembly as claimed in claim 18, wherein the roller is an elongated circular rod and comprises a pair of parallel end surfaces, the roller defines a threaded hole in the center of each end surface, the threaded end of each bolt passes through the corresponding through hole and is engaged in the corresponding threaded hole, and each elastic element wraps around the threaded post and the connecting pole.

20. The positioning assembly as claimed in claim 13, wherein when the roller is located at the lowest position, the roller contacts and presses the bottom board.

* * * * *